United States Patent [19]

Christenson et al.

[11] 4,403,085

[45] Sep. 6, 1983

[54] POLYURETHANE CROSSLINKERS, AND THE PROCESS FOR PREPARING AND USING THE SAME

[75] Inventors: Roger M. Christenson; Thomas R. Hockswender, both of Gibsonia, Pa.

[73] Assignee: PPG Industries, Inc., Pittsburgh, Pa.

[21] Appl. No.: 330,290

[22] Filed: Dec. 14, 1981

[51] Int. Cl.$^3$ .................... C08G 18/81; C08G 18/32; C08G 18/60

[52] U.S. Cl. ...................... 528/45; 528/66; 525/124; 525/403; 525/440; 525/453; 525/454; 428/425.8; 427/385.5; 427/239

[58] Field of Search ................. 528/45, 66, ; 428/425.8; 427/385.5, 239; 525/124, 403, 440, 453, 454

[56] References Cited

U.S. PATENT DOCUMENTS

| | | | |
|---|---|---|---|
| 3,412,054 | 11/1968 | Milligan et al. | 260/18 |
| 3,488,272 | 1/1970 | Frisch et al. | 204/181 |
| 3,658,939 | 4/1972 | Carpenter et al. | 260/858 |
| 3,669,939 | 6/1972 | Baker et al. | 260/78 A |
| 3,723,372 | 3/1973 | Wakimoto et al. | 260/29.1 R |
| 3,736,216 | 5/1973 | Hermann et al. | 161/62 |
| 3,773,729 | 11/1973 | Wakimoto et al. | 260/77.5 TB |
| 3,835,081 | 9/1974 | Remley | 260/29.2 TN |
| 3,897,377 | 7/1975 | Broecker et al. | 260/18 TN |
| 3,912,790 | 10/1975 | Chang et al. | 260/849 |
| 4,046,729 | 9/1977 | Scriven et al. | 260/29.2 TN |
| 4,066,591 | 1/1978 | Scriven et al. | 260/29.2 TN |
| 4,164,587 | 8/1979 | Borman | 426/131 |

*Primary Examiner*—John Kight, III
*Assistant Examiner*—M. L. Moore
*Attorney, Agent, or Firm*—Godfried R. Akorli

[57] ABSTRACT

A polyurethane crosslinker is provided by reacting a partially-blocked diisocyanate and a hydroxyl-terminated, carboxyl group-containing polyurethane precursor. The precursor is a reaction product of a diol containing a carboxyl group and another diol of high molecular weight, and a diisocyanate. The instant crosslinkers are particularly useful in water-based coating compositions for metal containers.

21 Claims, No Drawings

POLYURETHANE CROSSLINKERS, AND THE PROCESS FOR PREPARING AND USING THE SAME

BACKGROUND OF THE INVENTION

1. Field of the Invention

The present invention relates to polyurethanes. More specifically, it relates to coating compositions containing polyurethane crosslinkers, and to metal containers coated with such coating compositions.

2. Brief Description of the Prior Art

Generally, crosslinkers which are used in coatings would have an effect on the performance characteristics of said coatings. In can coatings, which are of a particular interest, the crosslinkers which are used therein must be such as would enable the can coating to meet very special (stringent) requirements. Such coatings must have excellent chemical properties, excellent fabricating properties, i.e., a combination of flexibility, extensibility and adhesion, so as to permit forming operations to be carried out on the coated metal without cracking or otherwise impairing the continuity of the film; excellent intercoat adhesion (e.g., adhesion to topcoat material); excellent adhesion to the bonding adhesive employed on the lap seam; and resistance to the high temperatures employed in container production or during pasteurization of the beverage (e.g., beer). Yet another requirement: even though the size coat (exterior) and base coat (interior) may not be in direct contact with the packaged beverage, the possibility exists that due to incomplete topcoat coverage or accidental exposure in the seam area; these coatings should, in this regard, be formulated so that they do not adversely affect the taste characteristics of or cause turbidity in the packaged beverage.

As will be recognized from the above, the production of container coating materials meeting all of these requirements is a difficult undertaking. Furthermore, the problem of producing successful coating materials of this type has been even further complicated by the increasing national emphasis on ecological and environmental concerns.

It is believed that the crosslinkers, employed in the preparation of the coatings, would have significant effects on coating properties of chemical resistance, flexibility and adhesion. To ensure these properties, much work has been done in the prior art relative to the crosslinkers. The challenge, in this regard, has been in providing coatings having, concurrently, the properties of chemical resistance, flexibility and adhesion. Meeting the desired standard of one of these properties (i.e., flexibility, adhesion or chemical resistance) had generally been at the expense of the other or others.

The present invention provides polyurethane crosslinkers, particularly water-reducible polyurethane crosslinkers, the coatings of which have been found to possess, concurrently, excellent properties of chemical resistance, flexibility and adhesion.

SUMMARY OF THE INVENTION

In accordance with the foregoing, the present invention encompasses a polyurethane which comprises a blocked isocyanate-terminated reaction product, derived from:
(1) a polyisocyanate,
(2) a blocking agent,
(3) a polyol having a molecular weight of 400 to 3000, and
(4) another polyol containing a carboxyl group, and having a molecular weight of 100 to 500.

In the embodiment of the invention as a water-reducible cross-linker, the immediately above reaction product is at least partially neutralized with a base such as an organic base, thus rendering it water-reducible.

In a particularly preferred embodiment, the present invention encompasses a polyurethane crosslinker, comprising a reaction product of:
(1) a partially-blocked polyisocyanate; and
(2) a hydroxyl-terminated, carboxyl group-containing polyurethane precursor which is a reaction product of:
  (A) a polyisocyanate; and
  (B) an admixture of:
    (i) a polyol having a molecular weight of 400 to 3000, and
    (ii) another polyol containing a carboxyl group, and having a molecular weight of 100 to 500.

In the embodiment of the invention as a water-reducible cross-linker, the immediately above reaction product is at least partially neutralized with a base such as an organic base, thus rendering it water-reducible.

The polyurethanes are, preferably, of a linear structure and are particularly useful as crosslinkers in coating compositions.

Further encompassed by the present invention are coating compositions comprising the polyurethanes as crosslinkers. In a particularly preferred embodiment, the present invention comprises can coating compositions comprising the water-reducible polyurethane crosslinkers. The can coatings, particularly those comprising the water-reducible crosslinkers, display the aforementioned desirable properties, notable among which are the properties of chemical resistance, flexibility and adhesion, conjointly.

In this context, the polyols of (B)(i) will be referred to as high molecular weight polyols; the polyols of (B)(ii) will be referred to as carboxyl-containing polyols; in both instances, diols are preferred. The term "precursor" is used herein to describe the hydroxyl-terminated polyurethanes which react to form the instant water-dispersible urethanes.

DETAILED DESCRIPTION OF THE INVENTION

The polyurethanes of the present invention comprise terminal isocyanate groups which are blocked, and a carboxyl group or a salt thereof. Typically, the instant polyurethanes have an equivalent weight of about 700 to 3000, preferably 1200 to 2000 relative to blocked isocyanate group. (The equivalent weight refers to weight of a molecule divided by the number of blocked isocyanate groups contained therein.) The instant polyurethanes are free of, or substantially free of, unreacted isocyanate groups.

In a preferred embodiment, the polyurethanes can be prepared by reacting a partially-blocked diisocyanate with a hydroxyl-terminated, carboxyl group-containing polyurethane precursor. Typically, a ratio of reaction of 0.5 to 1.0 mole of the partially-blocked diisocyanate to 1.0 mole of the hydroxyl-terminated precursor is employed. The reaction can be conducted by mixing the hydroxyl-terminated polyurethane precursor and the partially-blocked diisocyanate, generally, in the presence of a solvent, over a temperature range of 40° to 120° C.

The useful partially-blocked diisocyanates, as to their nature and method of preparation, are as follows: diisocyanates, either aromatic or aliphatic, can be reacted with a blocking agent, more fully described hereinafter, so that there is left unreacted as isocyanato group. The resulting compound which is described as a partially-blocked diisocyanate, thus, has a blocked isocyanate group which is stable at room temperature to active hydrogen group-containing compounds but reactive therewith, upon deblocking at about 200° F. (93° C.) to about 600° F. (316° C.).

Representative examples of the diisocyanates, useful herein, are the aliphatic diisocyanates such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene diisocyanates such as 1,3-cyclopentane, 1,4-cyclohexane and 1,2-cyclohexane diisocyanates; the aromatic compounds, such as m-phenylene, p-phenylene, 4,4'-diphenyl, 1,5-naphthalene and 1,4-naphthalene diisocyanates; the aliphatic-aromatic diisocyanates such as 4,4'-diphenylene methane, 2,4- or 2,6-toluene, or mixtures thereof, 4,4'-toluidine, and 1,4-xylylene diisocyanates; the nuclear-substituted aromatic compounds, such as dianisidine diisocyanate, 4,4'-diphenylether diisocyanate and chlorodiphenylene diisocyanate.

Preferably, the diisocyanate employed should have isocyanate groups with sufficiently different reactivity to facilitate the partial-blocking reaction. In this regard, isophorone diisocyanate and 2,4-toluene diisocyanate are illustrative of the preferred isocyanates. More preferred is 2,4-toluene diisocyanate.

In addition, the diisocyanate may be a prepolymer derived from the reaction of the diisocyanate, with active hydrogen-containing compounds such as polyols, polyethers, or polyesters, and the like, which have been reacted with an excess of diisocyanate.

The blocking agent can be any suitable aliphatic, cycloaliphatic or aromatic monoalcohol. For example, lower aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like; the aromatic alkyl alcohols, such as phenylcarbinol, methylphenylcarbinol, ethylene glycol monoethyl ether, ethylene glycol monobutyl ether, and the like. Minor amounts of higher molecular weight, relatively nonvolatile monoalcohols may be used, if desired, to serve as plasticizers in the coatings provided by this invention.

Additional blocking agents include lactams such as epsiloncaprolactam, valerolactam and the like, phenolics such as phenol or nonyl phenol, as well as oximes such as methyl ethyl ketone oxime, acetone oxime and cyclohexanone oxime.

The partially-blocked diisocyanate is formed by reacting a sufficient quantity of the blocking agent with the diisocyanate to provide a product having an unreacted isocyanate group. The reaction between the diisocyanate and the blocking agent is generally exothermic. The diisocyanate and the blocking agent are preferably admixed at low temperatures to promote isocyanate group selectivity. Usually temperatures of 10° C. or even lower can be employed and generally below about 40° C. and normally no higher than about 80° C.

While diisocyanates have been specifically described and indeed preferred, it is desired to point out that other polyisocyanates can be used, preferably, in conjunction with the diisocyanates, in the preparation of the partially-blocked isocyanates.

The partially-blocked polyisocyanate is formed by reacting a sufficient quantity of the blocking agent with the polyisocyanate to provide a product preferably having an unreacted isocyanato group per polyisocyanate molecule. The reaction conditions are essentially the same as described, relative to the reaction of diisocyanates. Illustrative examples of the polyisocyanates are triisocyanates such as triphenylmethane-4,4',4"-triisocyanate, 1,3,5-triisocyanato benzene and 2,4,6-triisocyanato toluene; tetraisocyanates such as 4,4'-diphenyldimethylmethane-2,2',5,5'-tetraisocyanate; and the polymerized polyisocyanates such as toluene diisocyanate dimers and trimers, and the like.

The hydroxyl-terminated, carboxyl group-containing polyurethane precursor, in a preferred embodiment, can be prepared as follows: A diisocyanate is reacted with an admixture of a carboxyl group-containing diol and a high molecular weight diol, as more fully described hereinafter, in a mole ratio of 2:1:2 of the diisocyanate, the carboxyl group-containing diol and the high molecular weight diol. In the preparation of the hydroxyl-terminated, carboxyl group-containing polyurethane precursor, it is preferred to premix the diols and then react the resulting admixture with the diisocyanate. Higher yields of the more linear and preferred polyurethane are, thus, obtained.

The diisocyanates which are used in the preparation of the hydroxyl-terminated precursor are the same as those afore-mentioned, for the preparation of the partially-blocked diisocyanates. For reasons stated above, while other polyisocyanates can be used herein, they are not preferred.

The carboxyl group-containing diols which are used in the preparation of the prepolymer can be represented by a formula:

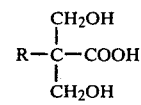

wherein R represents hydrogen or an alkyl or substituted group wherein the alkyl group contains from about 1 to 20 carbon atoms and preferably from about 1 to 8 carbon atoms.

Specific illustrative examples of acids that are employed in the invention include 2,2-di(hydroxymethyl) acetic acid, 2,2-di(hydroxymethyl) propionic acid, 2,2-di(hydroxymethyl) butyric acid, 2,2-di(hydroxymethyl) pentanoic acid, and the like. The preferred acid is 2,2-di(hydroxymethyl) propionic acid.

The useful high molecular weight diol can be a member of the class consisting of polyester diols, polyether diols and the like. Illustrative examples of these diols are alkylene oxide condensate of diols such as glycols, e.g., ethylene glycol and propylene glycol, diethylene glycol, tripropylene glycol and the like. Examples of the ethylene oxides that can be condensed with the diols are ethylene oxide, propylene oxide, butylene oxide, styrene oxide and the like. Some specific examples of the diols are polyoxyethylene glycol having a molecular weight of 1540, polyoxypropylene glycol having a molecular weight of 1025, polyoxytetramethylene glycol, polyoxyhexamethylene glycol, and mixtures thereof.

Further illustrating the useful high molecular weight diols are the polyester diols such as polycaprolactaone diol, butanediol adipate and the like.

While diols are specifically disclosed in the two instances above, and indeed preferred, it is desired to point out that they can be used, preferably, in conjunction with other polyols such as 2,2,2-tri(hydroxymethyl) acetic acid; and glycerol, trimethylolpropane, hexanetriol and pentaerythritol.

The following reaction conditions can be employed in the preparation of the precursors. The diol can be charged to a suitable reaction vessel equipped with a condenser, stirrer, heat transfer means, and the like. It is usually preferred to employ an inert solvent such as acetone, ethoxyethyl acetate or the like. The isocyanate is then charged and the mixture heated to about 50° to 120° C. It is desirable to carry out the reaction in an inert atmosphere. If desired, catalysts such as dibutyltin dilaurate, stannous octoate and the like can be used to accelerate the reaction of the isocyanates with the polyols to form the precursor. In accordance with this invention, the resulting precursor contains hydroxyl-terminated groups, and a carboxyl group. The obtained precursor is then reacted with the afore-described partially-blocked diisocyanate to form the polyurethane. The polyurethane is rendered water-reducible by at least partially neutralizing it with a base, as set forth more fully hereinafter. While the above method of preparing the embodiments of this invention have been described, herein, with a degree of particularity, it is desired to point out that other methods of preparing the instant polyurethanes are, also, envisaged. The so-called "one-pot" method can be adopted in preparing the polyurethanes, in accordance with this invention. In the one-pot method, the isocyanates, the blocking agent and the polyols are reacted in one pot either simultaneously or sequentially, under carefully controlled reaction conditions which would yield the polyurethane having the properties described in accordance with this invention.

As set forth hereinabove, the polyurethanes are rendered waterdispersible by reacting them with bases such as inorganic bases, e.g., potassium hydroxide or sodium hydroxide, or organic bases, e.g., ammonia, dimethylethanolamine, triethylamine, methylethanolamine, diethylethanolamine and the like, so as to obtain the desired degree of neutralization; this can be partial or total neutralization of the carboxylic group.

In their use as crosslinkers, the polyurethanes can be formulated with resinous vehicles, say, by blending. The resinous vehicles can be derived from any of the following active hydrogen group-containing resins: epoxy, acrylic, polyester, polyurethane, or the like. The crosslinkers can be present in the resulting resinous composition alone or in conjunction with other crosslinkers, usually, in amounts ranging from about 5 to 40 percent based on the total weight of the composition. As would be realized, water-based resinous vehicles are, advantageously, compatible with the crosslinkers.

Compositions of the resinous vehicle and the crosslinker can be used as a coating, particularly as a can coating, and can be applied by electrodeposition or other methods conventionally employed in the coating industry such as brushing, dipping, roll coating, flow coating, spraying and the like. After application, the compositions are ordinarily dried and/or cured by baking at elevated temperatures to produce hard thermoset films which have excellent properties of flexibility and chemical resistance.

These and other aspects of the invention are, further, described by the following examples. The examples are illustrative and are, therefore, not intended to be limiting as to the nature or scope of the invention.

EXAMPLES

EXAMPLE I

This example illustrates the water-reducible crosslinkers of the present invention, and their method of preparation and formulation.

Section A

This section describes the preparation of the water-reducible crosslinkers. The following were used in the preparation:

| Ingredients | Parts by Weight |
| --- | --- |
| POLYMEG 1000[1] | 333 |
| Dimethylolpropionic acid | 45 |
| M-PYROL[2] | 75.0 |
| 2,4-toluene diisocyanate[3] | 84.0 |
| Dibutyltin dilaurate | 1.0 |
| Half-capped isocyanate (solution)[4] | 107 |
| 2-butoxyethanol | 108 |

[1] Polytetramethylene ether glycol of 1000 molecular weight, available from Quaker Oats.
[2] N—methyl-2-pyrrolidinone, available from GAF.
[3] Available from E. I. DuPont de Nemours and Company as HYLENE-T.
[4] A 94% solids solution, in methyl isobutyl ketone, of an adduct of 2.0 equivalents of HYLENE T and 1.05 equivalents of 2-ethylhexanol.

The preparation was as follows: Into a reaction vessel, equipped with a stirrer, a thermometer, a dropping funnel and nitrogen blanket, were charged the POLYMEG 1000, dimethylolpropionic acid and M-PYROL, and heated to dissolve the dimethylolpropionic acid. At 54° C., with the dimethylolpropionic acid thoroughly dissolved, the resulting reaction mixture was cooled to 40° C. The toluene diisocyanate was added over a period of 15 minutes, while the temperature was kept below 80° C. The maximum temperature reached was 74° C. The resulting mixture was then heated to 101° C. over two hours, and thereafter cooled to 80° C. and then held for four hours. At 75° C., the dibutyltin dilaurate was added, followed by the addition of the half-capped isocyanate. Upon completion of the addition, the resulting mixture was held at 72° C. for two hours. After another two hours and at a temperature of 74° C., the 2-butoxyethanol was added. Resulting was the novel urethane crosslinker having a resin solids content of 75 percent by weight based on the total weight of the mixture, and an acid value of 25.

Section B

The above urethane crosslinker was blended with an epoxy-based film-former. The following were used in the preparation of the epoxy-based film-former:

| Ingredients | Parts by Weight |
| --- | --- |
| EPON 1007[1] | 2250.0 |
| 2-butoxyethanol | 1050.0 |
| Dibutyltin dilaurate | 22.5 |
| Diethylethanolamine | 120.0 |

-continued

| Ingredients | Parts by Weight |
| --- | --- |
| Thioglycolic acid | 93.0 |

[1] An epoxy resin having an epoxy equivalent of 2200-2500, available from Shell Chemical Co.

Into a reaction vessel, equipped with a stirrer, condenser, dropping funnel, thermometer, and nitrogen blanket, were introduced the EPON 1007 and 2-butoxyethanol and heated to 136° C. At 136° C., with the EPON 1007 melted, the resulting mixture was cooled to 50° C. The dibutyltin dilaurate was added followed by the addition of the diethylethanolamine and thioglycolic acid at a temperature of 47° C. Upon completion of the addition of the diethylethanolamine and thioglycolic acid, the resulting mixture was held at a temperature of 50° C. for one hour. Resulting was an epoxy-based film-former having an acid value of 16.8 and a Brookfield viscosity of 362,400 centipoise and a resin solids content of 62.4 percent based on the total weight of the mixture, measured at 150° C.

EXAMPLE II

A coating composition was prepared using the epoxy-based film-former, and the novel urethane crosslinker, prepared as described above. These, as well as the following ingredients, were used in the preparation:

| Ingredients | Parts by Weight |
| --- | --- |
| Urethane crosslinker of Example I | 112.2 |
| Epoxy resin of Example I | 42.5 |
| Dimethylethanolamine | 2.4 |
| BYK 301 (flow agent)[2] | 1.0 |
| Dibutyltin dilaurate | 1.0 |
| Deionized water | 100.0 |
| Deionized water | 100.0 |

[2] Available from BYK-Mallinckrodt Co.

The coating composition was prepared by blending the urethane crosslinker, the epoxy-based film-former, and the dimethylethanolamine, thoroughly, followed by the addition of the flow agent and the dibutyltin dilaurate, consecutively. The resulting mixture was then let down with the first and then the second batch of water. Resulting was a coating composition having a viscosity of 27.5 seconds measured by a No. 4 Ford cup, a pH of 7.1 and a total resin solids content of 28.3 percent.

The above coating was applied to tin-free steel substrate with a 0.012 drawbar. After baking for 8 minutes at 370° F. (188° C.), the films were well cured and had a uniform and glossy appearance.

The results of a wedge-bend test showed that the films possessed excellent flexibility properties; the results of a crosshatch test showed that the films possessed excellent dry adhesion properties; the results of pasteurization tests showed that the films possessed good properties relative to blushing, blistering and wet adhesion; the results of hardness and lubricity tests showed that the films possessed excellent properties in these areas. In addition, the coatings met other requirements for can coatings.

EXAMPLE III

This example also illustrates the water-reducible crosslinkers of the present invention, the method of preparation and the use thereof.

Section A

This section describes the preparation of the water-reducible crosslinkers. The following were used in the preparation:

| Ingredients | Parts by Weight |
| --- | --- |
| POLYMEG 1000 | 200.0 |
| Dimethylolpropionic acid | 53.6 |
| M-PYROL | 60.0 |
| 2,4-toluene diisocyanate | 69.6 |
| Dibutyltin dilaurate | 2.0 |
| Half-capped diisocyanate of Example I | 116.0 |
| 2-butoxyethanol | 100.0 |

Into a reaction vessel, equipped with a stirrer, a thermometer, a dropping funnel and nitrogen blanket, was charged the POLYMEG 1000, dimethylolpropionic acid and M-PYROL, heated to 73° C. and then held at this temperature for 30 minutes. Thereafter, and over a temperature range of 71° to 73° C., and for a period of 20 minutes, the toluene diisocyanate was added, while the temperature of the resulting mixture was held below 80° C. The maximum temperature attained was 78° C. The resulting mixture was held at 79° C. until all the isocyanates had been reacted, as determined by IR spectroscopy. At 73° C., the dibutyltin dilaurate was added followed by the addition of the half-capped diisocyanate. Upon completion of the addition, the resulting mixture was held at a temperature of 73° C., for two hours. After another two hours and at a temperature of 78° C., the 2-butoxyethanol was added. Resulting was the novel urethane crosslinker of the present invention, having a resin solids content of 70.5 percent by weight based on the total weight of the resulting mixture, and an acid value of 35.6.

Section B

The above urethane crosslinker was blended with an epoxy-based film-former which was prepared in essentially the same manner as described in Section B of Example I. The following were used in the preparation of the epoxy-based film-former:

| Ingredients | Parts by Weight |
| --- | --- |
| EPON 1007 | 2250.0 |
| 2-butoxyethanol | 1050.0 |
| Dibutyltin dilaurate | 22.5 |
| Diethylethanolamine | 120.0 |
| Thioglycolic acid | 93.0 |

Resulting was an epoxy-based film-former having an acid value of 16.8 and a Brookfield viscosity of 362,400 centipoise and a resin solids content of 62.4 percent based on the total weight of the mixture, measured at 150° C.

Section C

A coating composition was prepared with the modified epoxy-based film-former and the urethane crosslinker, in a manner which was essentially the same as described in Example II. The following were used in the preparation:

| Ingredients | Parts by Weight |
| --- | --- |
| Urethane crosslinker of Example II | 112.2 |
| Epoxy resin of Example II | 42.5 |
| Dimethylethanolamine | 2.4 |
| BYK 301 (flow agent) | 1.0 |
| Dibutyltin dilaurate | 1.0 |
| Deionized water | 100.0 |
| Deionized water | 100.0 |

Resulting was a coating composition having a viscosity of 27.5 seconds measured by a No. 4 Ford cup, a pH of 7.1 and a total resin solids content of 28.3 percent.

The above coating was applied to tin-free steel substrates with a 0.012 drawbar. After baking for 8 minutes at 370° F. (188° C.), the films were well cured and had a uniform and glossy appearance.

The results of a wedge-bend test showed that the films possessed excellent flexibility properties. By a crosshatch test, the films were shown to possess excellent adhesion properties; pasteurization tests showed that the films possessed good properties relative to blushing, blistering and adhesion; hardness and lubricity tests showed that the films possessed excellent properties in these areas. In addition, the coatings met all other requirements for can coatings.

EXAMPLE IV

This example illustrates the water-reducible crosslinkers of the present invention, the method of preparation and the use thereof.

Section A

This section describes the preparation of the water-reducible crosslinkers. The following were used in the preparation:

| Ingredients | Parts by Weight |
| --- | --- |
| PPG 2025[1] | 1680.0 |
| Dimethylolpropionic acid | 225.1 |
| M-PYROL | 252.0 |
| 2,4-toluene diisocyanate | 292.3 |
| Dibutyltin dilaurate | 8.4 |
| Half-capped diisocyanate of Example I | 487.2 |
| 2-butoxyethanol | 388.4 |

[1] A propylene glycol of molecular weight 2000, available from Union Carbide.

The preparation was as follows: The PPG 2025, dimethylolpropionic acid and M-PYROL were charged to a properly equipped reaction vessel, heated to 70° C., and then held for 30 minutes at 71° C. Over a period of 20 minutes and a temperature range of 69°–78° C., the toluene diisocyanate was added to the charge, while the temperature of the resulting mixture was held below 80° C. While adding the toluene diisocyanate, there was a resulting exotherm which peaked at 81° C. The resulting mixture was held at 78° C. until all of the toluene diisocyanate reacted as determined by IR spectroscopy. At 76° C., the dibutyltin dilaurate was added, followed by the addition of the urethane intermediate. Upon completion of the addition of the half-capped diisocyanate, the resulting mixture was held at 72° C., for two hours. After another two hours and at 79° C., the 2-butoxyethanol was added. The resulting mixture, a urethane crosslinker of the present invention, had a resin solids content of 80 percent by weight based on the total weight of the resultant mixture, an acid value of 29.2, and a Brookfield viscosity of 26,280 centipoise.

Section B

The above urethane crosslinker was blended with an epoxy-based film-former which was prepared in essentially the same manner as described in Example I, Section B. The following were used in the preparation:

| Ingredients | Parts by Weight |
| --- | --- |
| EPON 1007 | 2250.0 |
| 2-butoxyethanol | 750.0 |
| M-PYROL | 300.0 |
| Dibutyltin dilaurate | 22.5 |
| Diethylethanolamine | 120.0 |
| Thioglycolic acid | 93.0 |

Resulting was an epoxy resin of this invention having an acid value of 13.0, a reduced Gardner-Holdt viscosity of 26.8 seconds, and a resin solids content of 40 percent, based on the total weight of the resulting mixture.

Section C

A coating composition was prepared with the modified epoxy-based film-former, and the urethane crosslinker, in essentially the same manner as described in Example II. The following ingredients were used:

| Ingredients | Parts by Weight |
| --- | --- |
| Urethane crosslinker of Section A | 12.7 |
| Epoxy resin of Section B | 138.7 |
| Dimethylethanolamine | 0.56 |
| BYK 301 (flow agent) | 1.0 |
| Dibutyltin dilaurate | 1.0 |
| Deionized water | 100.0 |
| Deionized water | 20.0 |

Resulting was a coating composition having a viscosity of 30.7 seconds measured by a No. 4 Ford cup, a pH of 8.1 and a total resin solids content of 37.05 percent based on the total weight of the coating.

The above coating was applied to tin-free steel substrates with a 0.012 drawbar. The coating composition exhibited good flow. After baking for 8 minutes at 370° F., the films were well cured and had a uniform and glossy appearance.

The results of a wedge-bend test showed that the films possessed excellent flexibility properties. By a crosshatch test, the films were shown to possess excellent adhesion properties; pasteurization tests showed that the films possessed good properties relative to blushing, blistering and adhesion; hardness and lubricity tests showed that the films possessed excellent properties in these areas.

EXAMPLE V

This example illustrates the water-reducible crosslinkers of the present invention, the method of preparation and the use thereof.

Section A

This section describes the preparation of the water-reducible crosslinkers. The following were used in the preparation:

| Ingredients | Parts by Weight |
|---|---|
| POLYMEG 1000 | 200.0 |
| Dimethylolpropionic acid | 53.6 |
| Triethylamine | 32.0 |
| 2,4-toluene diisocyanate | 69.6 |
| Dibutyltin dilaurate | 2.0 |
| Half-capped diisocyanate of Example I | 116.0 |
| Methyl ethyl ketone | 50.0 |
| Deionized water | 100 |
| Deionized water | 58.5 |

The preparation was as follows: The POLYMEG 1000 and dimethylolpropionic acid were charged to a properly equipped reaction vessel and heated to 80° C. and held for one hour, at this temperature. At 70° C., the triethylamine was added to the charge. The temperature of the resulting mixture dropped to 65° C., and was held there for 45 minutes. Then, the mixture was heated to 70° C., followed by the addition of the toluene diisocyanate over a period of 20 minutes. During this addition, the temperature of the mixture was held below 80° C. The resulting mixture was very viscous, necessitating addition of the methyl ethyl ketone at 79° C. Thereafter, the addition of the dibutyltin dilaurate was commenced and conducted over a period of five minutes. The resulting mixture was held over a temperature range of 72°-76° C., until all the toluene diisocyanate reacted, as determined by IR spectroscopy. The dibutyltin dilaurate and the half-capped diisocyanate were then added to the resulting mixture which was then held for 4½ hours over a temperature range of 70°-76° C. The resulting mixture was then cooled and then the 2-butoxyethanol was added.

The resulting mixture was then stripped of methyl ethyl ketone, by heating it to a temperature range of 80°-85° C., followed by an addition of the first batch of water, distillation of 58.5 grams of material, and the addition of the second batch of water.

Resulting was a urethane crosslinker having a resin solids content of 64.1 percent and an acid value of 33.9.

Section B

The above urethane crosslinker was blended with an epoxy-based film-former which was prepared in essentially the same manner as described in Example I, Section B. The following were used in the preparation:

| Ingredients | Parts by Weight |
|---|---|
| EPON 1007 | 2250.0 |
| 2-butoxyethanol | 1050.0 |
| Dibutyltin dilaurate | 22.5 |
| Diethylethanolamine | 120.0 |
| Thioglycolic acid | 93.0 |

Resulting was an epoxy-based film-former having an acid value of 16.8 and a Brookfield viscosity of 362,400 centipoise and a resin solids content of 62.4 percent based on the total weight of the mixture, measured at 150° C.

Section C

A coating composition was prepared with the modified epoxy-based film-former, and the urethane crosslinker, in essentially the same manner as described in Example II. The following were used in the preparation:

| Ingredients | Parts by Weight |
|---|---|
| Urethane crosslinker of Section A | 112.2 |
| Epoxy resin of Section B | 42.5 |
| Dimethylethanolamine | 2.4 |
| BYK 301 (flow agent) | 1.0 |
| Deionized water | 100.0 |
| Deionized water | 100.0 |

The resulting mixture had a viscosity of 27.5 seconds measured by a No. 4 Ford cup, a pH of 7.1 and a total resin solids content of 28.3 percent.

The above coating was applied to tin-free steel substrates with a 0.012 drawbar. After baking for 8 minutes at 370° F., the films were well cured and had a uniform and glossy appearance.

The results of a wedge-bend test showed that the films possessed excellent flexibility properties. By a crosshatch test, the films were shown to possess excellent adhesion properties; pasteurization tests showed that the films possessed good properties relative to blushing, blistering and adhesion; hardness and lubricity tests showed that the films possessed excellent properties in these areas.

COMPARATIVE EXAMPLE

This example illustrates water-reducible crosslinkers which are different from those of the present invention, their method of preparation and use.

Section A

This section describes the preparation of the water-reducible crosslinkers. The following were used in the preparation:

| Ingredients | Parts by Weight |
|---|---|
| Dimethylolpropionic acid | 201.0 |
| Methyl isobutyl ketone | 51.1 grams |
| 2,4-toluene diisocyanate | 84.0 |
| Dibutyltin dilaurate | 1.0 |
| Half-capped diisocyanate of Example I | 1023.0 |
| 2-ethoxyethanol | 339.9 |

The preparation was as follows: The dimethylolpropionic acid, the half-capped diisocyanate and the methyl isobutyl ketone were charged to a reaction vessel, equipped with a stirrer, a thermometer, a dropping funnel and nitrogen blanket, and heated to 100° C., followed by the addition of 10 drops of the dibutyltin dilaurate. The resulting mixture was heated over a period of 15 minutes to 134° C., cooled and then digested until all or substantially all the isocyanate was consumed as determined by IR spectroscopy. Then, the 2-ethoxyethanol was added. The resulting mixture had an acid value of 74.6.

Section B

The above urethane crosslinker was blended with an epoxy-based film-former which was prepared as follows: The following were used in the preparation of the epoxy-based film-former:

| Ingredients | Parts by Weight |
|---|---|
| EPON 1007 | 2250.0 |
| 2-butoxyethanol | 1050.0 |
| Dibutyltin dilaurate | 22.5 |
| Diethylethanolamine | 120.0 |

-continued

| Ingredients | Parts by Weight |
| --- | --- |
| Thioglycolic acid | 93.0 |

Resulting was a reaction mixture having an acid value of 16.8 and a Brookfield viscosity of 362,400 centipoise and a resin solids content of 62.4 percent based on the total weight of the mixture, measured at 150° C.

Section C

A coating composition was prepared from the modified epoxy-based film-former, and the urethane crosslinker, in a manner which was essentially the same as described in Example II. The following were used in the preparation:

| Ingredients | Parts by Weight |
| --- | --- |
| Urethane crosslinker of Section A | 112.2 |
| Epoxy resin of Section B | 42.5 |
| Dimethylethanolamine | 2.4 |
| BYK 301 (flow agent) | 1.0 |
| Dibutyltin dilaurate | 1.0 |
| Deionized water | 100.0 |
| Deionized water | 100.0 |

The resulting mixture was then let down sequentially with the first and second batches of water. The resulting mixture had a viscosity of 27.5 seconds measured by a No. 4 Ford cup, a pH of 7.1 and a total resin solids content of 28.3 percent.

The above coating was applied to tin-free steel substrates with a 0.012 drawbar. After baking for 8 minutes at 370° F. (188° C.), the films were well cured and had a uniform and glossy appearance.

The results of a wedge-bend test showed that the films were substantially less flexible than those obtained from the coatings of this invention. The measured wedge bend values for this coating were 32-34 millimeters of cracked coating. In contrast, the wedge bend value for the coatings of Examples III and V, respectively, were 15 and zero.

We claim:

1. A polyurethane crosslinker which comprises a blocked isocyanate-terminated reaction product derived from:
   (1) a polyisocyanate,
   (2) a blocking agent,
   (3) a polyol having a molecular weight of 400 to 3000, and
   (4) another polyol containing a carboxyl group, and having a molecular weight of 100 to 500.

2. A polyurethane crosslinker of claim 1, wherein the polyisocyanate is a diisocyanate which is 2,4-toluene diisocyanate, isophorone diisocyanate or hexamethylene diisocyanate.

3. A polyurethane crosslinker of claim 2, wherein the diisocyanate is 2,4-toluene diisocyanate.

4. A polyurethane crosslinker which comprises a blocked isocyanate-terminated reaction product derived from:
   (1) a partially-blocked polyisocyanate; and
   (2) a hydroxyl-terminated, carboxyl group-containing polyurethane precursor which is a reaction product of:
   (A) a polyisocyanate; and
   (B) an admixture of:
      (i) a polyol having a molecular weight of 400 to 3000, and
      (ii) another polyol containing a carboxyl group, and having a molecular weight of 100 to 500.

5. A polyurethane crosslinker of claim 4, wherein the partially-blocked polyisocyanate is derived from a diisocyanate selected from the group consisting of 2,4-toluene diisocyanate, isophorone diisocyanate and hexamethylene diisocyanate.

6. A polyurethane crosslinker of claim 5, wherein the diisocyanate is 2,4-toluene diisocyanate.

7. A polyurethane crosslinker of claim 4, wherein the hydroxyl-terminated prepolymer is derived from a diisocyanate selected from the group consisting of 2,4-toluene diisocyanate, isophorone diisocyanate and hexamethylene diisocyanate.

8. A polyurethane crosslinker of claim 7, wherein the diisocyanate is 2,4-toluene diisocyanate.

9. A polyurethane crosslinker of claim 1 or 4, wherein the carboxyl group-containing polyol is of the formula:

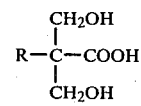

wherein R is hydrogen or an alkyl group containing from about 1 to 20 carbon atoms.

10. A polyurethane crosslinker of claim 9, wherein the alkyl group contains from about 1 to 8 carbon atoms.

11. A polyurethane crosslinker of claim 1 or 4, wherein the high molecular weight polyol is a polyether polyol or a polyester polyol.

12. A polyurethane crosslinker of claim 11, wherein the polyether polyol is a polytetramethylene ether glycol of molecular weight of about 1000.

13. A coating composition comprising the polyurethane crosslinker of claim 1 or 4 and a resinous vehicle comprising a member selected from the group consisting of active hydrogen group-containing epoxy, acrylic, polyester and polyurethane resins.

14. A coating composition of claim 13, wherein the resinous vehicle is an active hydrogen group-containing epoxy resin.

15. A water-reducible polyurethane crosslinker comprising the reaction product of claim 1 or 4 which is at least partially neutralized with a base.

16. A coating composition comprising the crosslinker of claim 15 and a resinous vehicle comprising a member selected from the group consisting of active hydrogen group-containing epoxy, acrylic, polyester and polyurethane resins.

17. A coating composition of claim 16, wherein the resinous vehicle is an active hydrogen group-containing epoxy resin.

18. A metal container coated with the composition of claim 13.

19. A metal container coated with the composition of claim 16.

20. A process for providing flexible and durable coatings for can containers, said process comprising:
   (i) applying to the surface of the container a coating composition as described in claim 13, and
   (ii) heating the coated substrate to a temperature sufficient to effect cure.

21. A process for providing flexible and durable coatings for can containers, said process comprising:
   (i) applying to the surface of the container a coating composition as described in claim 16, and
   (ii) heating the coated substrate to a temperature sufficient to effect cure.

* * * * *